(12) United States Patent
Semrau et al.

(10) Patent No.: US 10,312,674 B2
(45) Date of Patent: Jun. 4, 2019

(54) EXPLOSION-PROOF ASSEMBLY AND METHOD FOR PRODUCING SAME

(71) Applicant: R. STAHL Schaltgeräte GmbH, Waldenburg (DE)

(72) Inventors: Holger Semrau, Satteldorf (DE); Maxim Kutsch, Heilbronn (DE)

(73) Assignee: R. Stahl Schaltgerate GmbH, Waldenburg (DE)

(*) Notice: Subject to any disclaimer, the term of this patent is extended or adjusted under 35 U.S.C. 154(b) by 0 days.

(21) Appl. No.: 15/748,544

(22) PCT Filed: Jul. 5, 2016

(86) PCT No.: PCT/EP2016/065820
§ 371 (c)(1),
(2) Date: Jan. 29, 2018

(87) PCT Pub. No.: WO2017/016820
PCT Pub. Date: Feb. 2, 2017

(65) Prior Publication Data
US 2018/0226781 A1   Aug. 9, 2018

(30) Foreign Application Priority Data

Jul. 28, 2015   (DE) .................. 10 2015 112 284

(51) Int. Cl.
*H02G 3/08* (2006.01)
*H02G 3/06* (2006.01)
(Continued)

(52) U.S. Cl.
CPC ............ *H02G 3/088* (2013.01); *H01H 9/042* (2013.01); *H02B 1/28* (2013.01); *H02G 3/0625* (2013.01);
(Continued)

(58) Field of Classification Search
CPC . H01B 17/583; H01F 27/022; H01F 27/2847; H02G 3/088; H02G 3/081; H02G 3/22
(Continued)

(56) References Cited

U.S. PATENT DOCUMENTS

| 4,323,727 | A | * | 4/1982 | Berg | ..................... | H02G 3/065 |
| | | | | | | 174/135 |
| 7,875,803 | B2 | * | 1/2011 | Sjoberg | ................ | H01B 17/308 |
| | | | | | | 174/152 R |
| 8,134,089 | B2 | * | 3/2012 | Roseen | ................ | H01B 17/303 |
| | | | | | | 16/2.2 |

* cited by examiner

*Primary Examiner* — Dhiru R Patel
(74) *Attorney, Agent, or Firm* — Leydig, Voit & Mayer, Ltd.

(57) ABSTRACT

An explosion-proof arrangement (20) having a bushing part (23) with a bushing opening (24) that defines a bushing surface (25) and a structural unit (29) arranged in the bushing opening (24). The structural unit (29) includes a deformable inner body (31) with at least one conductor channel (32) extending through in a longitudinal direction (L), and a plastically deformable connecting sleeve (30) surrounding the inner body (31). At least one conductor (21) is guided through its own associated conductor channel (32) in the inner body (31). A connecting portion (33) of the connecting sleeve (30) is plastically deformed so that it presses radially inwardly on the inner body (31) and deforms it in a radial direction (R). A first delimiting surface (35) is formed on an outer circumference of the plastically deformed connecting portion (33). The bushing surface (25) forms a second delimiting surface (36). By arranging the structural unit (29) with the first delimiting surface (35) in the bushing opening (24), a flameproof Ex gap (37) is produced between the two delimiting surfaces (35, 36).

17 Claims, 5 Drawing Sheets

(51) Int. Cl.
   *H02G 3/22*     (2006.01)
   *H02G 15/013*   (2006.01)
   *H01H 9/04*     (2006.01)
   *H02B 1/28*     (2006.01)
(52) U.S. Cl.
   CPC ............... *H02G 3/081* (2013.01); *H02G 3/22* (2013.01); *H02G 15/013* (2013.01)
(58) Field of Classification Search
   USPC .......................................................... 174/650
   See application file for complete search history.

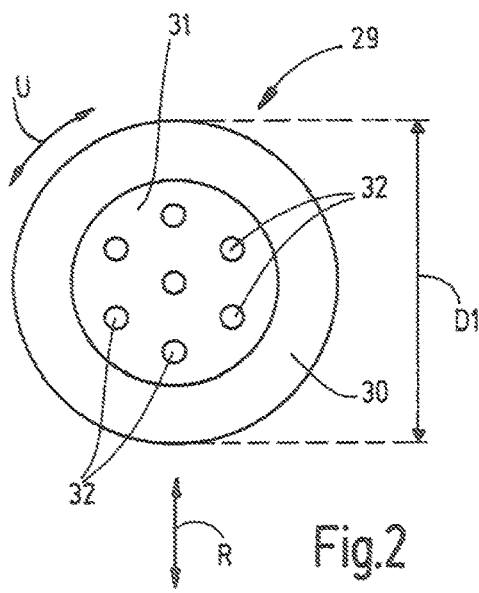
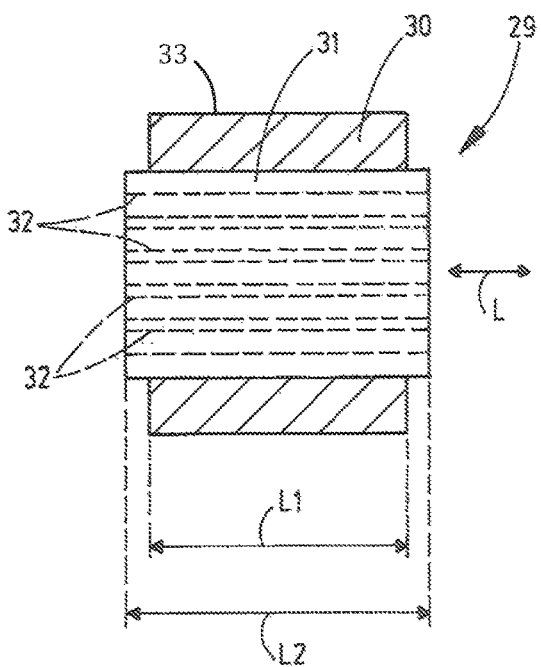
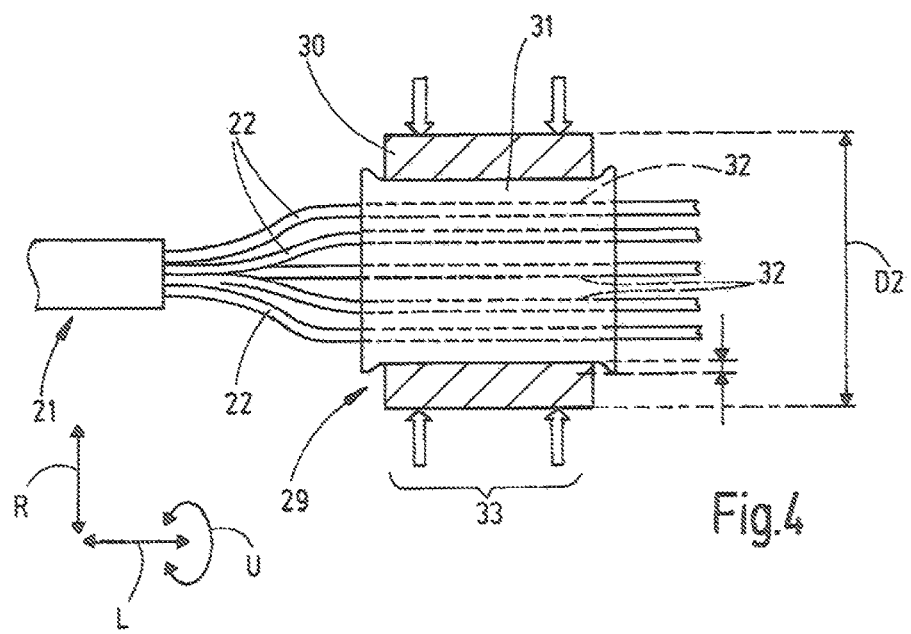

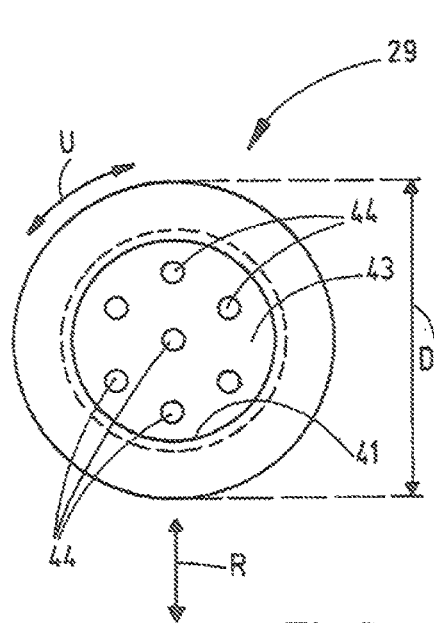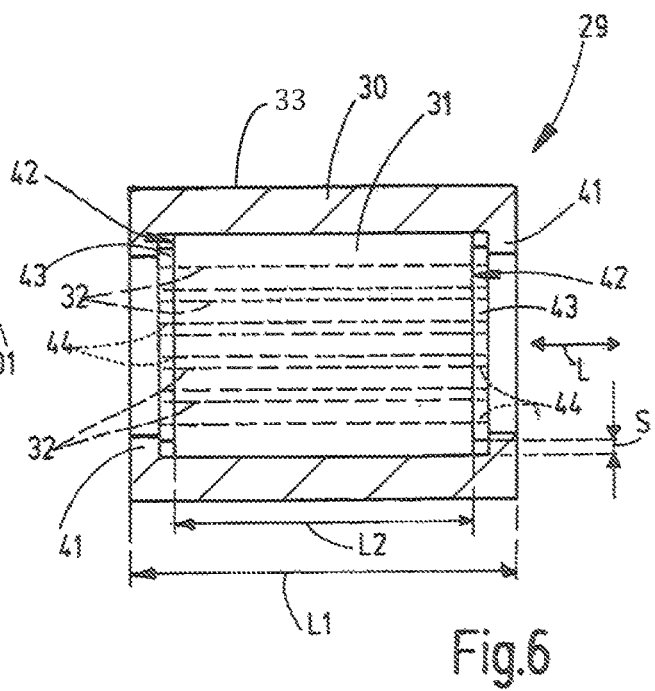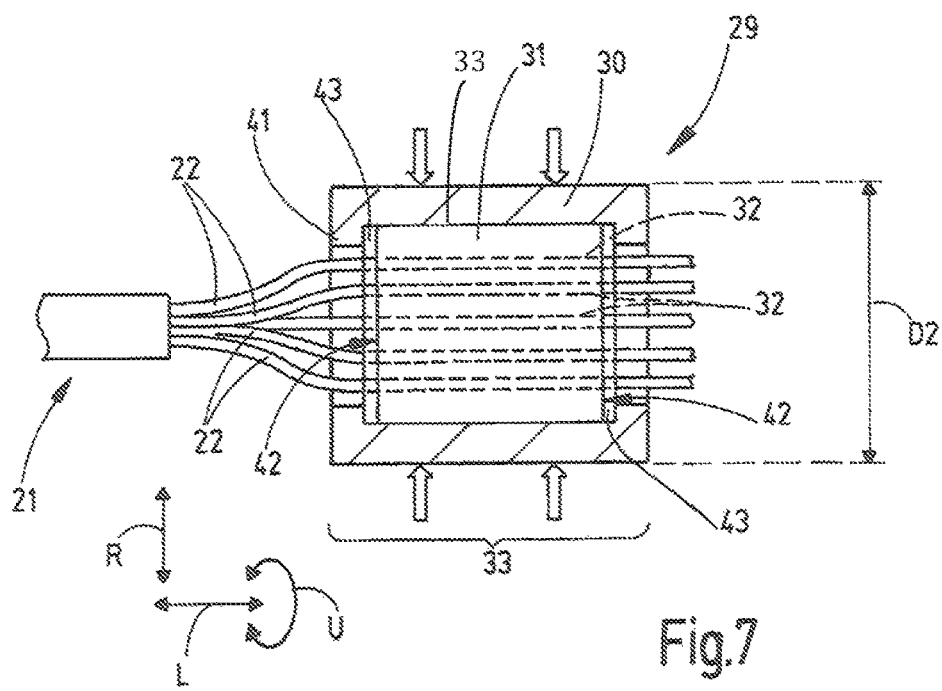

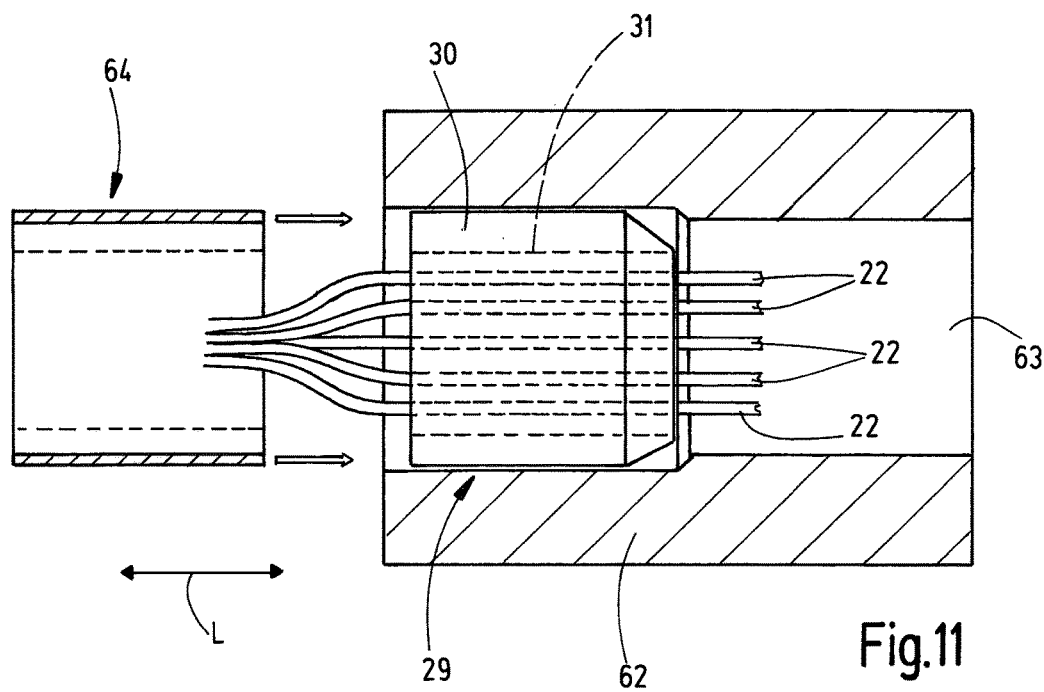
Fig.11
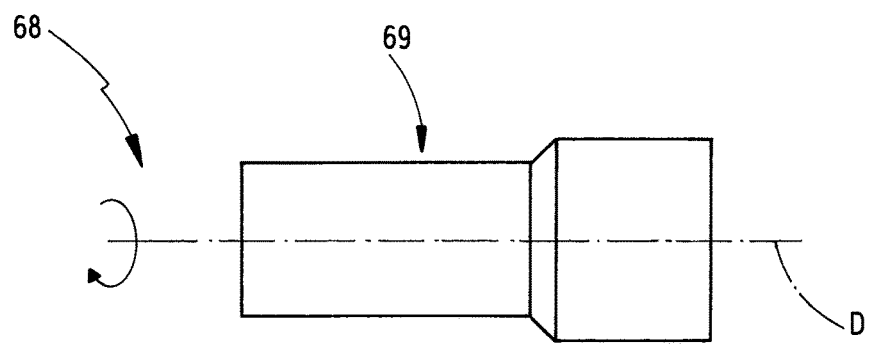
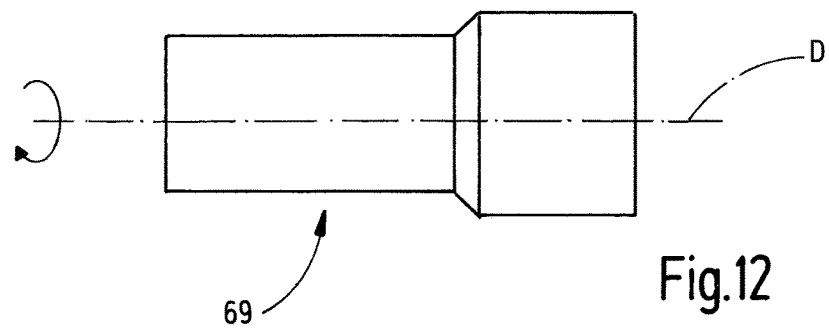
Fig.12

EXPLOSION-PROOF ASSEMBLY AND METHOD FOR PRODUCING SAME

FIELD OF THE INVENTION

The present invention relates to an explosion-proof assembly and a method for producing such assemblies.

BACKGROUND OF THE INVENTION

Explosion-proof assemblies are used to guide a conductor device with at least one electrical and/or optical conductor through a bushing part in an explosion-proof manner. The bushing part for example can be an integral part of a wall of an explosion-proof housing. However, the bushing part can also be an insert, which is arranged in turn in a wall of an explosion-proof housing.

The at least one conductor can be a conductor with one or more insulated electrical leads or cores and/or with at least one optical fibre and/or at least one optical fibre bundle.

The guiding of electrical and/or optical conductors from an atmosphere that is at risk of explosion into an explosion-proof space, for example within an explosion-proof housing, is complex. It must be ensured that there can be no ignition transmission outwardly from the explosion-proof space into the atmosphere at risk of explosion.

An explosion-proof assembly for multicore cables is known from DE 10 2012 111 270 A1. The explosion-proof assembly has a cable connection device with an outer sleeve and an inner sleeve. The sleeves are arranged coaxially relative to one another and the cable is guided through the inner sleeve. The outer sleeve has a crimping portion. This is made of plastically deformable material. The inner sleeve is elastically deformable. An elastic deformation of the inner sleeve arranged between the cable and the outer sleeve is achieved by deforming the crimping portion of the outer sleeve. Since the cable sheathing and the inner sleeve are made of elastically deformable material, a plastic material flow of the inner sleeve and of the cable sheathing is avoided, and thus there can be no setting of the material over a longer period of time. It is thus ensured that the cable is arranged in the cable connection device with flameproof gaps.

OBJECTS AND SUMMARY OF THE INVENTION

It is an object of the present invention to provide an improved explosion-proof assembly for guiding through a conductor device with at least one electrical conductor.

The explosion-proof assembly according to the invention comprises a bushing part, an inner body surrounded annularly by a connecting sleeve, and at least one conductor with preferably a plurality of electrical and/or optical leads. The conductor can be formed by a cable with a plurality of electrical and/or optical leads. The at least one conductor can be formed from a single wire or from a plurality of individual wires and/or by an optical fibre or an optical fibre bundle. The at least one conductor can also be formed by a body that is rigid transverse to its direction of extent under the forces normally occurring, for example a bar, a pin or stud.

A bushing opening is provided in the at least one bushing part, which bushing opening extends fully through the bushing part in a longitudinal direction and is delimited by a bushing surface.

The inner body is made of an elastically and/or plastically deformable material, which in particular contains an elastomer and which is preferably an electrical insulator. The inner body can be formed as an elastomer body. The inner body is preferably formed integrally without seams or joints. It is not moulded during or for production of the connection to the conductor, but instead is provided as a three-dimensional body. Each inner body has at least one conductor channel extending through the inner body in the longitudinal direction. Each conductor of the at least one conductor extends through its own conductor channel in the inner body. In the region of the respective conductor channel, the particular conductor guided through is preferably surrounded by a sheathing and can also preferably be electrically insulated with respect to the connecting sleeve by a sheathing and/or by an inner body if an electrical conductor is provided.

The at least one connecting sleeve is made of a plastically deformable material. The connecting sleeve is preferably formed integrally without seams or joints. The connecting sleeve for example can be made of a material containing metal, in particular can be made of a steel or aluminium or an alloy thereof. A mechanical connection is established between the connecting sleeve and the inner body and the conductor by means of plastic deformation of a connecting portion of the connecting sleeve. The mechanical connection is produced by a frictional engagement and optionally additionally by a form fit. During the plastic deformation of the connecting portion, the material of the connecting sleeve presses from outside against any conductor guided through one of the provided conductor channels.

A particular feature of the explosion-proof assembly according to the present invention lies in the fact that when the connecting sleeve is connected in a frictionally engaged manner to the conductor as a result of the plastic deformation of a portion of the outer surface of the connecting portion, a first delimiting surface is formed. The bushing surface of the bushing opening in the bushing part forms a second delimiting surface. The first and the second delimiting surface form a flameproof Ex gap. Following the connection of the connecting sleeve by means of the inner body to the conductor by the plastic deformation of the connecting portion, it is therefore sufficient to arrange the connecting sleeve with the first delimiting surface in the bushing opening. The outer dimensions of the first delimiting surface are adapted to the inner dimensions of the bushing surface of the second delimiting surface, so that the flameproof Ex gap is formed by the arrangement of the connecting sleeve or connecting portion thereof in the bushing opening and in particular by insertion of the connecting sleeve with the inner body into the bushing opening in the longitudinal direction. This arrangement can be produced very easily, economically and quickly.

The plastic deformation of the connecting portion is preferably produced by exerting a mechanical force onto the connecting portion from outside.

An integrally bonded connection between the inner body and the conductor and between the connecting sleeve and the inner body preferably is not provided. The plastic deformation of the connecting sleeve can be achieved in particular by a deformation process, such as extrusion or impact extrusion or rolling.

The bushing part can likewise be produced from a material containing metal or from steel. It can alternatively also be produced from plastic. The bushing part is preferably formed by a moulded part.

It is advantageous if the inner body rests directly and without a flamegap against the conductor or sheathing thereof. It is also advantageous if the connecting sleeve rests directly and without a flamegap against the inner body.

A conductor is preferably guided in a precise manner through a provided conductor channel. A cable having a plurality of insulated conductors can be freed of the outer casing in order to be guided through, and the individual cores can each be guided through their own associated conductor channel. A conductor can be provided in each conductor channel provided. A closure means, in particular a closure stopper, can be introduced or inserted into a conductor channel through which no conductor is guided, preferably prior to the plastic deformation of the connecting portion.

The arrangement is preferably designed to guide the conductor through in a flameproof encapsulation (Ex d).

It is advantageous if the flameproof Ex gap is embodied as an air gap. A filling, for example by a moulding material or adhesive, is spared. It is thus possible to separate the connection between the connecting sleeve and the bushing part in a destruction-free manner.

The first delimiting surface is preferably arranged coaxially relative to the region in which a flameproof connection exists between the inner body and the at least one lead of the conductor.

It is additionally advantageous if the first delimiting surface of the plastically deformed deformation portion and the second delimiting surface are each embodied as surfaces without indentations or protrusions. The surfaces are embodied as flat surfaces so to speak. In particular, the two delimiting surfaces can be thread-free. The Ex gap provided in this embodiment has the contour of an annular gap that is fully or partially closed in the circumferential direction. If the first delimiting surface and the second delimiting surface are arranged coaxially relative to one another, a hollow-cylindrical Ex gap is produced.

The cross-sectional contours of the connecting sleeve or of the connecting portion and of the bushing opening are adapted to one another in order to form the Ex gap. The outer dimensions of the first delimiting surface of the plastically deformed connection portion are preferably slightly smaller than the inner dimensions of the second delimiting surface or bushing surface, so that the connecting portion can be arranged easily in the bushing opening without forming a press fit. Here, the cross-sectional shapes can be selected arbitrarily in principle. The first delimiting surface and the bushing surface or second delimiting surface can thus have a polygonal, oval, elliptical or any other cross-section. It is preferred if the two delimiting surfaces each have a circular cross-section.

In another exemplary embodiment of the explosion-proof assembly, it can also be advantageous if the first delimiting surface is formed with an outer thread and the bushing surface of the second delimiting surface is formed with an inner thread, which can be connected to said outer thread. The Ex gap in this exemplary embodiment is embodied at least in portions as a threaded gap. It is possible to screw the connecting sleeve into the bushing opening so that undesirable relative movements in the longitudinal direction are also prevented.

It is also advantageous if the connecting portion extends substantially over the entire length of the connecting sleeve in the longitudinal direction. This is understood to mean a connecting portion of which the length in the longitudinal direction is at least 70% or at least 80% or at least 90% of the total length of the connecting sleeve. In one exemplary embodiment the connecting sleeve, in addition to the connecting portion, also comprises only an axial end portion at one axial end or both axial ends, which axial end portion for example forms a chamfer in each case. In order to produce the mechanical connection to the conductor, substantially the entire connecting sleeve is thus plastically deformed. For example, the connecting sleeve can be deformed by extrusion or impact extrusion or rolling and thus mechanically connected to the conductor, this being very simple and economical.

It is advantageous if the length of the connecting sleeve in the longitudinal direction is less than the length of the inner body, which thus protrudes out from the connecting sleeve. By reducing the cross-section of the connecting sleeve during the plastic deformation, an axial securing of the inner body at the connecting sleeve with respect to a relative movement in the longitudinal direction can also be achieved in this way, because the end portions of the inner body protruding out from the connecting sleeve are not elastically and/or plastically deformed radially inwardly or are elastically and/or plastically deformed radially inwardly to a lesser extent.

The connecting sleeve can have, at both axial longitudinal ends, at least one radial protrusion protruding inwardly in a radial direction radially to the longitudinal direction. The length of the connecting sleeve in the longitudinal direction is greater here than the length of the inner body. The at least one radial protrusion is preferably an integral part of the connecting sleeve.

In a preferred embodiment the inner body can be arranged between two rigid holding plates in the longitudinal direction. The holding plates cover the axial end faces of the inner body and have at least one hole in order to ensure the accessibility of the at least one conductor channel. The holding plates and the inner body preferably have the same hole pattern, that is to say the same pattern of arrangement of the holes or conductor channels. The radial dimension of the holding plates in a radial direction at right angles to the longitudinal direction is smaller than the radial dimension of the inner body in its starting state prior to the plastic deformation of the connecting portion.

The connecting sleeve can surround the holding plates and the inner body. Prior to the plastic deformation of the connecting portion, there is play provided in the radial direction between the connecting sleeve and the holding plates so as to enable the deformation of the connecting portion radially inwardly.

The holding plates can each be arranged between the at least one radial protrusion and the inner body. The holding plates are preferably not directly connected to the inner body in an integrally bonded manner or in some other way, and instead rest against the inner body and are held by the connecting sleeve. It is advantageous if an anti-twist means is provided between the holding plates and the connecting sleeve in order to avoid a relative rotation in the circumferential direction about the longitudinal direction.

It is also advantageous if a securing device is provided. The securing device is designed to secure the connecting sleeve at the bushing part against an undesirable relative movement in the longitudinal direction. In particular, it is thus ensured that the deformation portion with the first delimiting surface does not leave the bushing opening, and therefore the length of the Ex gap in the longitudinal direction is maintained. The securing device in one exemplary embodiment can have at least one securing part that is elastically movable and/or deformable radially outwardly, for example a snap ring. At the opposite end of the bushing opening, the securing device can have a rigid axial stop at the bushing part. The connecting sleeve can be secured by the axial stop and the securing part against an undesirable movement in the longitudinal direction relative to the bushing part.

It is additionally advantageous if the connecting sleeve has a chamfer at least at one axial end. The chamfer is preferably provided only at the axial end associated with the bushing opening of the bushing part prior to the insertion of the connecting sleeve in the longitudinal direction. The securing device, for example the snap ring, can thus be splayed open as the connecting sleeve is inserted into the bushing opening and enables the connecting portion or the connecting sleeve to be inserted into the bushing opening easily and without the use of tools.

In one embodiment the entire securing device can be an integral part of the bushing part and can engage around the connecting sleeve so to speak on both axial sides. The bushing part in this embodiment can be formed for example by two shells which can be connected to one another and which, following connection thereof, secure the connecting sleeve against a movement in the longitudinal direction. The shells each have a circumferential portion of the bushing surface and form the bushing opening when they are connected to one another in such a way that the circumferential portions supplement one another to form the bushing surface, which is closed in the circumferential direction.

The explosion-proof assembly can be produced as follows:

A bushing part having the bushing opening is firstly provided. The bushing opening is delimited in the circumferential direction by a bushing surface. In addition, at least one connecting sleeve made of a plastically deformable material is provided and surrounds an elastically and/or plastically deformable inner body. The inner body has at least one conductor channel extending through the inner body in the longitudinal direction.

The at least one lead of the at least one conductor is guided through the respective associated conductor channel of the inner body. Any unused conductor channels are preferably closed by a closure stopper. The connecting sleeve is then plastically deformed in the region of the connecting portion. The plastically deformed portion outer surface of the connecting portion of the connecting sleeve is referred to as the first delimiting surface. The cross-sectional area in the connecting portion or the first delimiting surface is reduced during the plastic deformation. As a result of the plastic deformation, the connecting sleeve is mechanically connected to the inner body and the conductor or the at least one conductor in the at least one conductor channel so as to form a structural unit. This connection is frictionally engaged and optionally additionally form-fitting and in particular is not integrally bonded.

Following the production of the mechanical connection or of the structural unit, the connecting portion or the entire connecting sleeve is arranged in the bushing opening. The bushing surface of the bushing opening constitutes a second delimiting surface, wherein a flameproof Ex gap is formed between the two delimiting surfaces.

The connecting sleeve can be secured against a movement of undesirable magnitude relative to the bushing part in the longitudinal direction. This securing can be produced already during the arrangement of the connecting portion in the bushing opening.

The plastic deformation of the connecting portion or of the connecting sleeve is achieved preferably by extrusion or impact extrusion or rolling.

Other objects and advantages of the invention will become apparent upon reading the following detailed description and upon reference to the drawings.

BRIEF DESCRIPTION OF THE DRAWINGS

FIG. 2 is a schematic depiction of a connecting sleeve and inner body of an exemplary embodiment of the explosion-proof arrangement as viewed in a longitudinal direction, FIG. 3 is a longitudinal section of the connecting sleeve and inner body shown in FIG. 2, FIG. 4 is a longitudinal section of the exemplary embodiment of an explosion-proof assembly with the connecting sleeve and the inner body shown in FIGS. 2 and 3, FIG. 5 is a schematic depiction of an exemplary embodiment of a connecting sleeve and an inner body with holding plates, as viewed in a longitudinal direction, FIG. 6 is a longitudinal section of the exemplary embodiment with the connecting sleeve, inner body, and holding plates shown in FIG. 5, FIG. 7 is a longitudinal section of an exemplary embodiment with an explosion-proof arrangement that includes the connecting sleeve, inner body, and holding plates shown in FIGS. 5 and 6, FIG. 11 is a schematic depiction of an exemplary plastic deformation in the production of the connecting sleeve, and FIG. 12 is an alternative embodiment for deforming the connecting sleeve with the aid of rollers.

Figure 1:
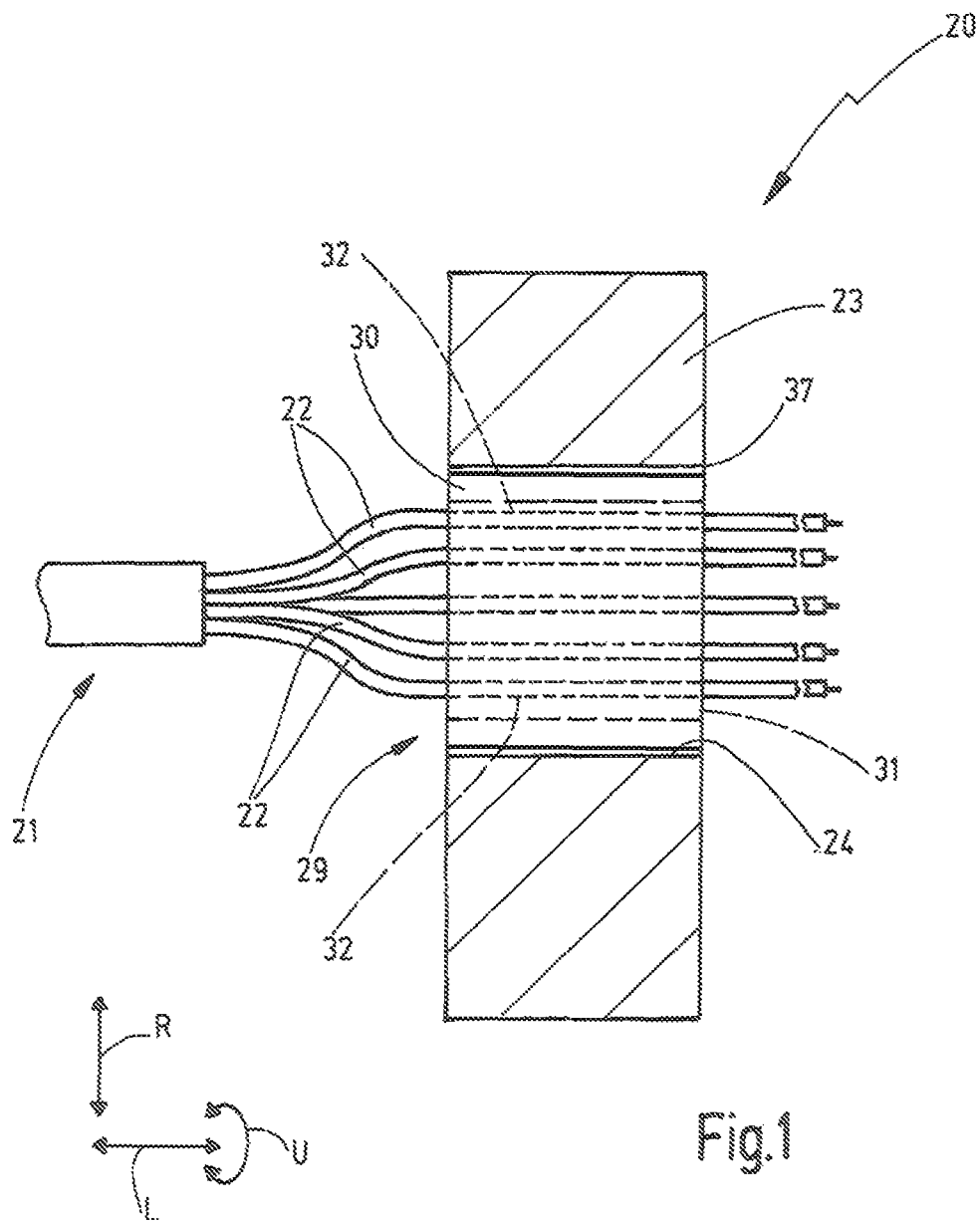
FIG. 1 is a schematic depiction of an exemplary embodiment of an explosion-proof assembly in accordance with the invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE PREFERRED EMBODIMENTS

Referring now more particularly to the drawings, and specifically to FIGS. 1, 4, 7 and 8, there are shown preferred embodiments of an explosion-proof assembly 20 in accordance with the invention. The explosion-proof assembly 20 is used to guide a conductor 21 through a wall, for example a wall of a housing, and in particular a flameproof encapsulation (Ex d). The conductor 21 thus can be guided in a flameproof manner with the aid of the explosion-proof assembly 20 from an atmosphere that is at risk of explosion, through the wall, into an explosion-proof region, for example into the interior of an explosion-proof housing.

The conductor 21 has at least one electrical and/or optical lead 22 or a plurality of leads 22. Each lead 22 can be embodied by an individual wire or a plurality of wires in the form of a stranded wire and/or by an optical fibre or an optical fibre bundle. Each electrical lead 22 can have its own electrical insulation. Each electrical and/or optical lead 22 can have a sheathing. The conductor 21 can be embodied as a multi-core cable, wherein the leads 22 for example can each be formed by a core. Alternatively, it is also possible that a lead 22 is formed by a rigid body, for example a stud, a pin, or the like.

The explosion-proof assembly 20 has a bushing part 23 with a bushing opening 24, which passes completely through the bushing part 23 in a longitudinal direction L. The bushing opening 24 preferably has a circular cross-section of constant diameter. The bushing opening 24 is delimited in a circumferential direction U about the longitudinal direction L to form a cylindrical bushing surface. The bushing part 23 can be an integral part of the wall, for example the wall of an explosion-proof housing. It can also be formed as a separate part, since it is arranged in the wall in a flameproof manner, for example by means of a threaded connection and/or an integrally bonded connection (adhesive bonding, welding, etc.).

The explosion-proof assembly additionally includes a structural unit 29, which has a connecting sleeve 30 and an inner body 31. The connecting sleeve 30 is made of a plastically deformable material, for example of a metal or a metal alloy, and can contain steel or aluminium. The inner body 31 is elastically and/or plastically deformable in a radial direction R at right angles to the longitudinal direction L. In accordance with the example it contains an elastomer or is formed as an elastomer body. The connecting sleeve 30 surrounds the inner body 31 completely in the circumferential direction U. In the non-deformed starting state, the outer diameter of the inner body 31 corresponds to the inner diameter of the connecting sleeve 30, so that the inner body 31 rests inwardly against the connecting sleeve 30 and for example can be held on the connecting sleeve 30 in a frictionally engaged manner.

The inner body 31 is passed through completely in the longitudinal direction L by at least one conductor channel 32 in the longitudinal direction L. A separate conductor channel 32 is provided in the inner body 31 for each lead 22. The number of conductor channels 32 is at least the same as the number of the leads 22 to be guided through. The cross-sectional contour of a conductor channel 32 is adapted to the cross-sectional contour of the lead 22 to be guided through and in accordance with the example is circular. Other cross-sectional shapes with vertices or without vertices are also possible.

The connecting sleeve 30 has an outermost connecting portion 33 for mounting within the bushing opening 24. The connecting portion 33 in this case is cylindrical and preferably extends substantially over the entire first length L1 of the connecting sleeve 30. This is to be understood to mean that the connecting portion 33 preferably occupies at least 70% or 80% or 90% of the entire first length L1. In the exemplary embodiments according to FIG. 1-7 the connecting portion 33 extends over the entire first length L1 of the connecting sleeve 30.

The structural unit 29 is connected mechanically and preferably in a frictionally engaged manner within itself and to the leads 22 of the conductor 21. For this purpose, a deformation force acts on the connecting portion 33 of the connecting sleeve 30 and is illustrated by way of example by block arrows in FIGS. 4 and 7. The outer diameter of the connecting portion 33 is reduced by the deformation force. In the non-deformed starting state, the connecting portion 33 has a first diameter D1 (FIGS. 2 and 5), which is reduced following the plastic deformation to a smaller, second diameter D2 (FIGS. 4 and 7). Prior to the plastic deformation of the connecting portion 33 of the connecting sleeve 30, the leads 22 are guided through the conductor channels 32 and in accordance with the example are inserted through in the longitudinal direction L. The inner body 31 is elastically and/or plastically deformed in the radial direction R as a result of the plastic deformation of the connecting sleeve or of the connecting portion 33, and presses against the leads 22 guided through the conductor channels 32. The deformable inner body 31 thus rests against the leads 22 without a flamegap. At the same time, the inner surface of the connecting sleeve 30 is pressed against the outer circumferential surface of the inner body 31 without a flamegap.

Following the plastic deformation of the connecting portion 33, the conductor 21 or leads 22 thereof is/are therefore connected to the structural unit 23 in a flameproof manner. An integrally bonded connection between the leads 22 and the inner body 31 on the one hand and between the inner body 31 and the connecting sleeve 30 is not provided. The connection is purely mechanical.

The outer surface of the connecting portion 33 is referred to as a portion outer surface. This portion outer surface of the connecting portions 33 is deformed by the plastic deformation of the connecting portion 33 to form a first delimiting surface, which has the second diameter D2.

Figure 8:
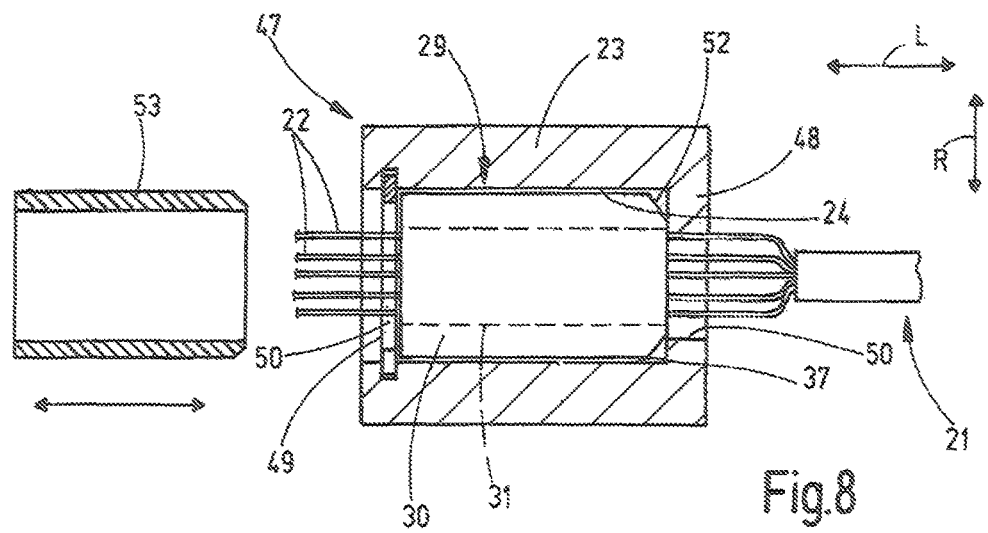
FIG. 8 is a longitudinal section of an exemplary embodiment of an explosion-proof arrangement with a securing device.

A second delimiting surface is formed by the inner surface of the bushing opening 24. By arranging the structural unit 29 or at least the connecting portion 33 of the connecting sleeve 30 in the bushing opening 24, the first delimiting surface and the second delimiting surface form a flameproof Ex gap 37 (FIGS. 1 and 8). The first delimiting surface and the second delimiting surface are preferably flat as considered in the longitudinal direction L, without protrusions or indentations, so that the Ex gap 37 created is hollow-cylindrical in form coaxial with the connecting sleeve 30 and bushing opening 24. By means of a radial displacement in the radial direction R, the Ex gap 37 can also be symmetrical and for example can have a sickle-shaped cross-section.

As can be seen for example from FIGS. 4 and 7, the first delimiting surface 35 is arranged coaxially relative to the region in which the flameproof connection between the inner body 31 and the conductors is formed by the pressing of the inner body 31 against the leads 22 in the conductor channel 32. The Ex gap 37 is preferably embodied as an air gap and is not filled by potting compounds or other fillers.

In a variant of the illustrated exemplary embodiments, the two delimiting surfaces 35, 36 could also each have matching threads, so that the Ex gap 37 can be formed at least in part by a threaded gap. In the preferred exemplary embodiments depicted here, the two delimiting surfaces are each curved in cross-section without vertices and without edges, for example in a circular manner.

In the exemplary embodiment according to FIG. 2-4, the first length L1 of the connecting sleeve 30 is smaller than a second length L2 of the inner body 31. The inner body 31 in accordance with the example protrudes at both of its axial ends out from the connecting sleeve 30 in the longitudinal direction L. By means of a plastic deformation of the connecting sleeve 30, the inner body 31 is pressed radially inwardly against the two protruding axial ends to a lesser extent, or even not at all. The axial ends therefore have a diameter that is greater than the inner diameter of the connecting sleeve 30, which is illustrated schematically in FIG. 4. As a result of this measure, it is possible to prevent the inner body 31 from being displaced axially relative to the connecting sleeve 30 in the longitudinal direction L.

In another exemplary embodiment according to FIG. 5-7 the inner body 31 has a second length L2, which is smaller than the first length L1 of the connecting sleeve 30. At both longitudinal ends, the connecting sleeve 30 has at least one radial protrusion 41. In the exemplary embodiment illustrated here, each radial protrusion 41 is formed by a radial flange that is annularly closed in the circumferential direction U. Alternatively, a plurality of radial protrusions 41 could also be distributed in the circumferential direction U at a distance from one another. The plastic deformation in the radial direction R can thus be simplified.

In the longitudinal direction L the distance between radial protrusions 41 arranged on opposite sides is greater than the second length L2 of the inner body 31. A holding plate 43 is arranged in each case between the two end faces 42 of the inner body 31 arranged oppositely in the longitudinal direction L and the adjacent at least one radial protrusion 41. The holding plate 43 rests against the associated end face 42 and is held captively by the adjacent at least one radial protrusion 41. At least one hole 44 is provided on the holding plate 43 so as to be able to access the at least one conductor channel 32 in order to guide through the leads 22. In the exemplary embodiment the number of holes 44 corresponds to the number of conductor channels 32. The arrangement of the holes 44 is selected so that they are aligned with the conductor channels 32. The diameter of the holes 44 can be selected to be greater than the diameter of the conductor channels 32, so that any relative displacement caused by the deformation of the inner body 31 is taken into consideration.

It can be seen in FIG. 6 that, in the non-deformed starting state of the connecting sleeve 30, the outer diameter of the inner body 31 is greater than the outer diameter of the holding plates 43, whereby a play S remains. This play S is available for the plastic deformation and the diameter reduction of the connecting portion 33 or of the connecting sleeve 30. The holding plates 43 are not deformed during the deformation of the connecting sleeve 30. The inner diameter of the connecting sleeve 30 or of the connecting portion 33 preferably corresponds, after the plastic deformation, to the outer diameter of the holding plates 43 (FIG. 7). The holding plates 43 are preferably produced from a metal or a metal alloy and can be made of the same material as the connecting sleeve 30.

An exemplary embodiment of a securing device 47 is illustrated in FIG. 8. The securing device 47 includes a first stop 48 and a second stop 49 arranged at a distance from said first stop in the longitudinal direction L. The first stop 48 in the exemplary embodiment is an integral part of the bushing part 23 and delimits the bushing opening on one side in the longitudinal direction L. The first stop 48 has a hole 50, through which the leads 22 of the conductor 21 can be guided, wherein the diameter of the hole 50 is sufficiently small so that the structural unit 29 cannot pass through in the longitudinal direction L.

The second stop 49 likewise has a hole 50, for guiding through the leads 22 or the conductor 21, with an outer diameter that is smaller in its securing position than that of the connecting sleeve 30. The second stop 49 is movable and/or deformable in the radial direction R in the exemplary embodiment. The second stop 49 can therefore be moved and/or deformed radially outwardly from the securing position for insertion of the structural unit 29 into the bushing opening 24.

The second stop 49 is formed in accordance with the example by a deformable securing element, which is embodied here as a snap ring. The snap ring is C-shaped and is not completely closed in the circumferential direction U about the longitudinal direction L, but is slotted at a point. It can therefore expand as the structural unit 29 is guided through. The snap ring assumes its non-expanded securing position (rest position) when the structural unit 29 is arranged fully in the bushing opening 24. This securing or rest position of the snap ring is illustrated in FIG. 8.

The securing element or snap ring is arranged in a circumferential groove in the bushing part 23, adjacently to the bushing opening 24. In the radial direction R, a radial play is provided between the bushing part 23 and the securing element in the rest state or in the securing state of the securing element, so that said securing element can expand in order to allow the structural unit 29 to be guided through.

In this embodiment a chamfer 52 is provided on the connecting sleeve 30 in order to simplify the insertion of the structural unit 29 into the bushing opening 24. The chamfer 52 is optional. Alternatively to the presented embodiment, it could also be provided on the insertion side of the securing element or of the snap ring.

With the aid of a sleeve or another comparable tool 53, the snap ring or the securing element can be expanded, and the structural unit 29 removed again from the bushing opening 24, against the insertion direction. The securing device 47 thus prevents movement between the structural unit 29 and the bushing part 23 in a releasable manner. The relative movement between the structural unit 29 and the bushing body 23 in the longitudinal direction L does not have to be prevented in such a way that all relative movement is inhibited. It is sufficient to limit the relative movement in the longitudinal direction L in such a way that the Ex gap 37 is not shortened, which would compromise the protection against ignition transmission.

In the embodiment depicted in FIG. 8 the structural unit 29 is arranged fully in the bushing opening 24. In a variant, part of the structural unit 29 can also protrude out from the bushing opening 24 through one of the holes 50. It is sufficient if the first delimiting surface 35 of the connecting sleeve 30 is arranged within the bushing opening 24, so that the two delimiting surfaces form and maintain the Ex gap 37.

Figure 9:
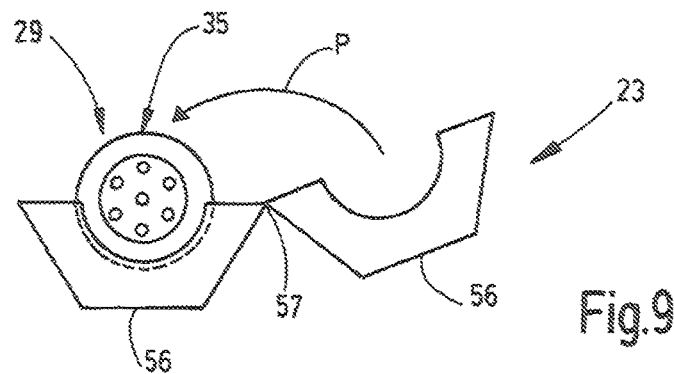
FIG. 9 is a front view of an exemplary embodiment of a bushing part.
Figure 10:
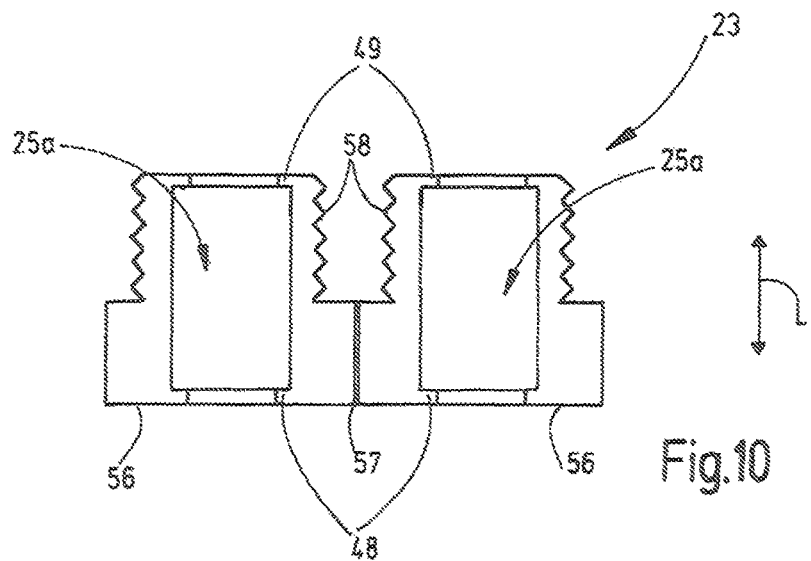
FIG. 10 is a plan view of the bushing part shown in FIG. 9.

A further variant of a bushing part 23 is illustrated in FIGS. 9 and 10 and has a securing device 57 with the stops 48, 49. Here, the bushing part 23 is formed from two shells 56, which can be connected and/or are connected to one another. In the exemplary embodiment the two shells 56 are connected to one another at a longitudinal edge running in the longitudinal direction L by means of a film hinge 57. The film hinge 67 forms a pivot bearing point, about which both shells 56 can be pivoted relative to one another. Each shell contains a circumferential portion 25a of the bushing surface. The two stops 48, 49 are also each provided in part on the two shells 56. In accordance with the example a semicircular part of each stop 48 and 49 is provided on each shell 56.

The structural unit 49 can be placed into one of the shells 56 when the bushing part 23 is folded open. The two shells are then folded together with the aid of the film hinge 57, as is depicted schematically in FIG. 9 by the arrow P. In so doing, the two circumferential portions 25a supplement one another to form the bushing surface. The two stop parts of a stop 48, 49 are likewise in each case supplemented, so that the structural unit 29 is secured within the bushing opening 24 in the longitudinal direction L. The explosion-proof assembly 20 can thus be produced.

As depicted schematically in FIG. 10, the bushing part 23 can have a thread and in particular an outer thread 58, by means of which it can be screwed into a threaded hole in the wall in an explosion-proof manner.

FIG. 11, in a highly schematic manner, illustrates plastically deforming the connecting sleeve 30 or the connecting portion 33 and for producing the flameproof structural unit 29. To this end, the leads 22 are guided through the conductor channels 32 of the inner body 31 and are arranged in a mould 62 having a deformation channel 63. The deformation channel 63 tapers at one or more points in order to reduce the diameter of the structural unit 29 from the first diameter D1 to the second diameter D2 and in order to plastically deform the connecting sleeve 30. Here, the connecting sleeve 30 can originally be formed so that a chamfer 52 remains on the deformed connecting sleeve 30, this being illustrated in a simplified manner in FIG. 11.

The connecting sleeve 30 is deformed by extrusion or impact extrusion and in particular by direct extrusion. The structural unit 29 with the connecting sleeve 30 is pushed in the longitudinal direction L through the channel 63 of the mould 62. The deformation channel 63 is circular cylindrical in portions or tapers conically between the circular cylindrical portions of different diameter. The cross-section of the deformation channel 63 is adapted at its entry portion to the outer cross-section of the connecting sleeve 30, which is not yet deformed. The other end portion of the deformation channel 63 corresponds to the cross-section that the connecting sleeve 30 shall have following the plastic deformation.

The structural unit 29 or the connecting sleeve 30 is moved through the deformation channel 63 with the aid of a ram 64. The ram 64 can have two ram parts arranged concentrically relative to one another, which are each adapted to the cross-section of a portion of the deformation channel 63, so as to move the connecting sleeve 30 or the structural unit 29 through the deformation channel 63. The structural unit 29 can be moved completely through the deformation channel 63 in the same movement direction by means of the ram 64. Alternatively, it is also possible to provide an ejector on the other side of the deformation channel 63, which ejector moves the deformed structural unit 29 back through and out of the deformation channel 63 in the opposite direction following the plastic deformation.

Another possibility for deforming the connecting sleeve 30 or the structural unit 29 is illustrated schematically in FIG. 12. There, a rolling device 68 with two rolling tools 69 is illustrated. Each rolling tool 69 can rotate about its own axis of rotation D. The two axes of rotation D of the two rolling tools 69 are arranged at a distance from one another, so that a free space remains between the two rolling tools 69. This free space or the distance between the rolling tools can be set so that the connecting sleeve 30, at least in the connecting portion 33, is provided with the plastically deformed, reduced second diameter D2. Instead of the rotating rolling tools 69, the connecting sleeve 30 or the structural unit 29 could also be deformed between two planar deformation tools, which move relative to one another in parallel alignment, so that the connecting sleeve 30 is rolled between the two planar deformation tools, whereas the distance between the two planar deformation tools is set so that the diameter of the connecting sleeve 30 is reduced to the second diameter D2.

From the foregoing, it can be seen that the invention relates to an explosion-proof arrangement 20. The arrangement 20 has a bushing part 23 with a bushing opening 24, which is delimited by a bushing surface. A structural unit 29 is arranged in the bushing opening 24. The structural unit 29 has and elastically and/or plastically deformable inner body 31 with at least one conductor channel 32 passing through fully in a longitudinal direction L. The inner body 31 is surrounded by a plastically deformable connecting sleeve 30 of the structural unit 29 in a circumferential direction U about the longitudinal direction L. At least one lead 22 of a conductor 21 is guided in each case through its own associated conductor channel 32 in the inner body 31. A connecting portion 33 of the connecting sleeve 30 is plastically deformed so that it presses radially inwardly on the inner body 31 and deforms this in a radial direction R radially to the longitudinal direction L. The inner body thus presses in a flameproof manner against the at least one lead 22 guided through the at least one conductor channel 32. In addition, the inner body 31 presses against the connecting sleeve 30 in a flameproof manner. A first delimiting surface is produced on the plastically deformed connecting portion 33 at the outer circumference. The bushing surface forms a second delimiting surface. By arranging the structural unit 29 with the first delimiting surface in the bushing opening 24, a flameproof Ex gap 37 is produced between the two delimiting surfaces. The structural unit 29 is preferably arranged in the bushing opening 24 by means of an insertion movement in the longitudinal direction L and is secured on the bushing part 23 against an undesirable relative movement in the longitudinal direction L, for example by means of a securing device 47. The Ex gap 37 is preferably thread-free.

LIST OF REFERENCE SIGNS 20 explosion-proof assembly
21 conductor
22 lead
23 bushing part
24 bushing opening
25 bushing surface
25a circumferential portion of the bushing surface
29 structural unit
30 connecting sleeve
31 inner body
32 conductor channel
33 connecting portion
34 portion outer surface
35 first delimiting surface
36 second delimiting surface
37 Ex gap
41 radial protrusion
42 end face of the inner body
43 holding plate
47 securing device
48 first stop
49 second stop
50 hole
51 securing element
52 chamfer
56 shell
57 film hinge
58 outer thread
62 mould
63 deformation channel
64 ram
68 roller device
69 roller tool
D1 first diameter
D2 second diameter
L longitudinal direction
L1 first length
L2 second length P arrow
R radial direction
S play
U circumferential direction

The invention claimed is:

1. An explosion-proof assembly (20) comprising:
a bushing part (23) having a bushing opening (24) with a bushing surface (25),
an inner body (31) made of a deformable material having at least one conductor channel (32) extending through the inner body (31) in a longitudinal direction (L),
at least one conductor (21) extending through the at least one conductor channel (32) and having at least one electrical and/or optical conductor lead (22),
said inner body (31) being surrounded by a connecting sleeve (30) in a circumferential direction (U) about the longitudinal direction (L), said connecting sleeve (30) being made of a plastically deformable material and pressing inwardly on the inner body (31) as a result of plastic deformation of a connecting portion (33) of the inner body (31) which connects the inner body (31) to the conductor (21) in a frictionally engaged manner, and
said plastically deformed connecting portion (33) of said connecting sleeve (30) having a plastic deformed outer surface (34) that defines a first delimiting surface (35) which forms a flameproof [Ex] gap (37) with a second delimiting surface (36) defined by said bushing surface (25) configured to prevent any flame transmission through the [EX] gap.

2. The explosion-proof assembly of claim 1 in which said connecting sleeve (30) rests directly against the inner body (31) without a first flameproof gap.

3. The explosion-proof assembly of claim 2 in which said inner body (31) engages said at least one conductor (21) with a flameproof connection, and said first delimiting surface is arranged coaxially relative to where the flameproof connection between the inner body (31) and the at least one conductor (21).

4. The explosion-proof assembly of claim 1 in which said at least one conductor (21) extends through said inner body (31) with a flameproof encapsulation [Ex d] about the at least one conductor (21).

5. The explosion-proof assembly of claim 1 in which said flameproof [Ex] gap (37) is an aft gap.

6. The explosion-proof assembly of claim 1 in which said first delimiting surface and said second delimiting surface both are surfaces without indentations or protrusions.

7. The explosion-proof assembly of claim 6 in which said first delimiting surface and said second delimiting surface each have a curved contour without vertices.

8. The explosion-proof assembly of claim 1 in which the length of the connecting portion (33) is more than 70[%] percent of the length of the connecting sleeve (30).

9. The explosion-proof assembly of claim 1 in which the length of said connecting sleeve (30) in the longitudinal direction (L) is a different length, greater or smaller, than the length of the inner body (31).

10. The explosion-proof assembly of claim 1 in which the connecting sleeve (30) at each of its opposite axial longitudinal ends has at least one radial protrusion (41) protruding inwardly in a radial direction (R) relative to the longitudinal direction (L).

11. The explosion-proof assembly of claim 10 in which said inner body (31) is arranged in the longitudinal direction (L) between two rigid radial holding plates (43), said holding plates (43) having a radial dimension in a radial direction (R) at right angles to the longitudinal direction (L) that is smaller than the radial dimension of the inner body (31) prior to the plastic deformation of the connecting portion (33).

12. The explosion-proof assembly of claim 11 in which said holding plates (43) are each arranged between the at least one radial protrusion (41) and the inner body (31).

13. The explosion-proof assembly of claim 1 in which said at least one conductor (21) has a plurality of conductors leads (22) which are each guided separately through a respective conductor channel (23) is the deformable inner body (31).

14. The explosion-proof assembly of claim 1 including a securing device (47) for securing the connecting sleeve (30) to the bushing part (23) in the longitudinal direction (L).

15. The explosion-proof assembly of claim 14 in which said securing device (47) is a form-fitting about the inner body (31) such that at least at one point outside the bushing opening (24) the inner body (31) has a dimension in the radial direction (R) that is greater than the dimension of the bushing opening (24) in the radial direction (R).

16. The explosion-proof assembly of claim 15 in which the securing device (47), at least in part, is an integral part of the bushing part (23).

17. A method for producing an explosion-proof assembly (20) having the following steps:
providing a bushing part (23) having a bushing opening (24) with a bushing surface (25),
providing an inner body (31) made of a deformable material having at least one conductor channel (32) extending through the inner body (31) in a longitudinal direction (L), and a connecting sleeve (30) made of a plastically deformable material which surrounds the inner body (31) in a circumferential direction (U) about the longitudinal direction (L),
guiding an electrical and/or optical conductor leap (22) of at least one conductor (21) through its own associated conductor channel (32) in the inner body (31),
plastically deforming the connecting sleeve (30) in a connecting portion (33) such that at least a portion of an outer surface
(34) of the plastically deformed connecting portion (33) is plastically deformed to form a first delimiting surface (35), and
arranging the connecting portion (33) of the connecting sleeve (30) in the bushing opening (24) so that the first delimiting surface (35) of the connecting portion (33) forms a flameproof [Ex] gap (37) with a second delimiting surface (36) defined by the bushing surface (34) configured to prevent any flame transmission through the [Ex] gap (37).

* * * * *